Dec. 22, 1942.   R. B. CAMPBELL   2,306,012
CHECK VALVE
Filed June 11, 1941

INVENTOR
RODNEY B. CAMPBELL
BY
HARRIS, KIECH, FOSTER & HARRIS

*Clarence F. Kiech*
FOR THE FIRM
ATTORNEYS

Patented Dec. 22, 1942

2,306,012

UNITED STATES PATENT OFFICE 2,306,012

CHECK VALVE

Rodney B. Campbell, Los Angeles, Calif., assignor to John Eley, Jr., Los Angeles, Calif.

Application June 11, 1941, Serial No. 397,573

1 Claim. (Cl. 277—70)

This application is a continuation-in-part of my copending application for Regulating valve, Serial No. 258,975, filed February 28, 1939, to which reference is hereby made.

A primary object of the invention is to provide a valve device which includes check valve means for holding the working pressure in the working portion of a fluid system.

Other objects and advantages will appear from the following specification and the drawing, which is for the purpose of illustration only and in which.

Figure 1:
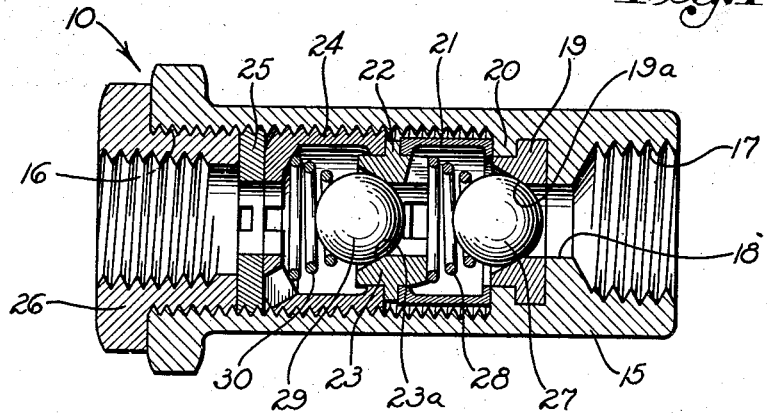
Fig. 1 is a vertical sectional view of my invention.

Referring to the drawing, a check valve means 10, shown in detail in Fig. 1, has an outer tubular housing 15 having a threaded main bore 16 at one end and a threaded counterbore 17 at the other end, the bores being connected by a central passage 18 axially aligned with a first annular seat member 19 rigidly secured in the housing 15 and provided with a relatively long conical seating face 19a. The first seat member 19 is preferably cast integrally with the tubular housing 15, as described hereinafter, but it will be evident that I do not intend to be limited to such construction and that the first seat member may be secured in the tubular housing in any manner well known in the art. An annular shoulder 20 is formed on the interior of the tubular housing 15, which is engaged by one end of a tubular sleeve 21, the other end thereof bearing against one side of an annular flange 22 formed on a second annular seat member 23 provided with a relatively long conical seating face 23a. The other side of the flange 22 is engaged by a threaded sleeve 24 which is threaded into the main bore 16, the sleeves 21 and 24 retaining the second seat member in rigid position relative to the tubular housing 15. A lock nut 25 is threaded into the main bore 16 to engage the threaded sleeve 24 to retain it securely in place, and an outer pipe fitting 26 is also threaded into the main bore to permit the check valve means 10 to be connected in a fluid flow line (not shown). Adapted to seat on the seating face 19a of the first annular seat member 19 is a first ball valve element 27, normally held in seated position by a first compression spring 28, and adapted to seat on the seating face 23a of the second annular seat member 23 is a second ball valve element 29, normally held in seated position by a second compression spring 30.

The tubular housing 15 is preferably cast from duralumin or other suitable material, having the first annular seat member 19 cast integrally therewith. I have found that if the first annular seat member is first formed of steel having a very high temper (Burnell rating) so as to render it extremely hard, when it is later cast into the tubular housing 15 the casting process draws sufficient of its temper to render it extremely tough without unduly decreasing its hardness. This method provides a seat member of a desired hardness and having highly desirable wear-resisting characteristics in a housing in which hardness is unnecessary, and this method is an important feature of my invention. As will be apparent to those skilled in the art, the counterbore 17 is adapted to have threaded into it the end of a supply pipe carrying fluid under pressure, and the outer pipe fitting 26 is adapted to have threaded into it a discharge pipe, the check valve means 10 being adapted to prevent a reverse flow from the discharge pipe to the supply pipe.

Figure 2:
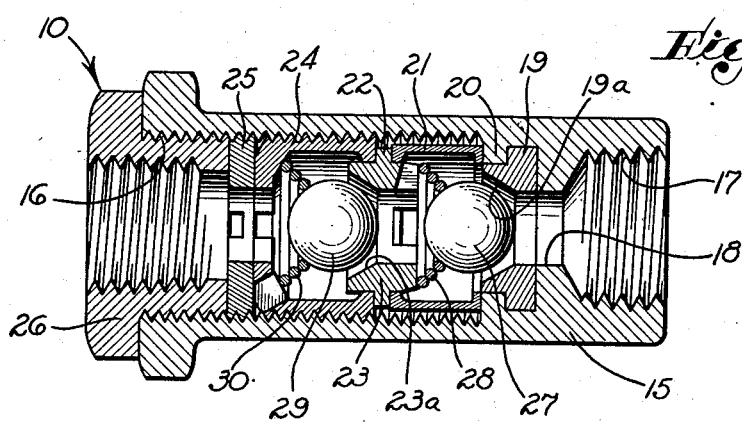
Fig. 2 is a view similar to Fig. 1 but showing the ball valve members in open position.

The construction and operation of the check valve means 10 are of particular importance. It will be noted that the check valve means 10 is provided with two conical seats 19a and 23a having ball valve elements 27 and 29 cooperating therewith, respectively, and in the event that one of the ball valve elements collects dirt or other foreign materials thereunder preventing it from seating, the other ball valve element picks up and holds the pressure load imposed by fluid passing through the check valve means from the counterbore 17, thus doubly insuring that the closing action of the check valve means 10 will be positive. In such an event, when the next surge of pressure fluid passes through the check valve means 10 from the counterbore 17 to the pipe fitting 26, it will act to flush the dirt or foreign material under the ball valve element which has not been carrying the pressure fluid load, thus automatically cleaning the check valve means 10. By providing both ball valve elements 27 and 29 of the same diameter, together with the other features of my construction, an unrestricted flow of fluid is permitted, a result not possible with prior types of devices. Fig. 2 shows the check valve means 10 with both of the ball valve members 27 and 29 off their seats 19a and 23a, respectively, which is the normal open position of the ball valve members when fluid is flowing through the check valve means. It will be noted that in this open position the ball valve members 27 and 29 are supported by the springs 28 and 30, respectively, in substantial axial alignment with the central passage 18 and the axial opening 19a, respectively, and that there is a large clearance between the sides of the ball valve members and the inside walls of the tubular sleeve 21 and the threaded sleeve 24, respectively. This permits a free and substantially uninterrupted flow of fluid around the ball valve members and through the check valve means 10, and substantially reduces the formation of undesirable eddy currents in the fluid flow behind the ball valve members. It is also to be noted that the length of the valve seats 19a and 23a is substantially equal to that of the radii of the ball valve members, which is an important feature in that it permits the ball valve members to positively seat thereon without hunting a seating position, which is normally the case where the length of a valve seat of this general type is short. In other words, by providing relatively long seats for the ball valve members, I provide a guiding means for smoothly guiding the ball valve members into seated position. It will further be noted that all of the internal elements of my check valve means 10 nest together and may be inserted in sequence through the major bore 16, which greatly facilitates assembly.

Figure 3:
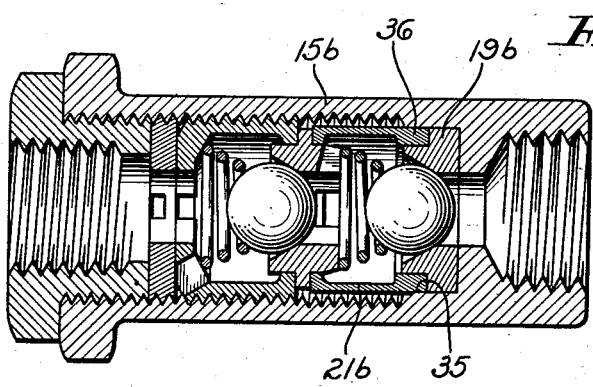
Fig. 3 is a vertical sectional view of an alternative embodiment of my invention.

The alternative embodiment shown in Fig. 3 is generally similar in structure and operation to the check valve means 10, and for simplicity of description similar parts will be similarly numbered but with the addition of the suffix b thereto. In the device shown in Fig. 3, the annular shoulder 20 of Fig. 1 is omitted from the housing 15b so as to form an annular recess 35 between the first annular seat 19b and the housing 15b, into which an enlarged end 36 formed on the tubular sleeve 21b fits. In this form of the device, the first annular seat 19b is not cast with the housing 15b, as described in connection with the device shown in Fig. 1, but is a separate piece which is insertable in the housing 15b like the other internal parts of the device. Thus, in the device shown in Fig. 3 the first annular seat 19b may be replaced readily, and the difficulty of accurately casting it in aligned position, which is sometimes true of the device shown in Fig. 1, is not experienced, both of which features add to the utility of this embodiment of the invention.

Although I have shown and described my invention in simple and practical form, it will be understood that I do not intend to be limited to the particular construction shown, but intend to be afforded the full scope of the following claim.

I claim as my invention:

In a check valve device, the combination of: a tubular housing having an inlet and an outlet and an internal shoulder adjacent said inlet in the bore of said housing, said bore having a threaded portion at its outlet end; a first annular seat member in said bore abutting against said shoulder and having a first conical engaging face disposed toward said outlet; a first ball valve member adapted to seat on said first engaging face; a sleeve abutting against said first annular seat member and having an internal diameter substantially greater than the diameter of said first ball valve member; a second annular seat member in said bore abutting against said sleeve and having a second conical engaging face disposed toward said outlet; a first compression spring engaging said second seat member and said first ball valve member; a second ball valve member adapted to seat on said second engaging face; a tubular retainer engaging said second seat member and having an internal diameter substantially greater than the diameter of said second ball valve member, said tubular retainer being externally threaded and screwed into said threaded portion so that a pipe fitting can be screwed into the outer end of said threaded portion without changing the position of said tubular retainer; and a second compression spring engaging said tubular retainer and said second ball valve member.

RODNEY B. CAMPBELL.